J. E. MATEER & W. R. WOODWARD.
TRANSFORMER FOR METERING SYSTEMS.
APPLICATION FILED SEPT. 10, 1915.
1,242,962.
Patented Oct. 16, 1917.
2 SHEETS—SHEET 1.
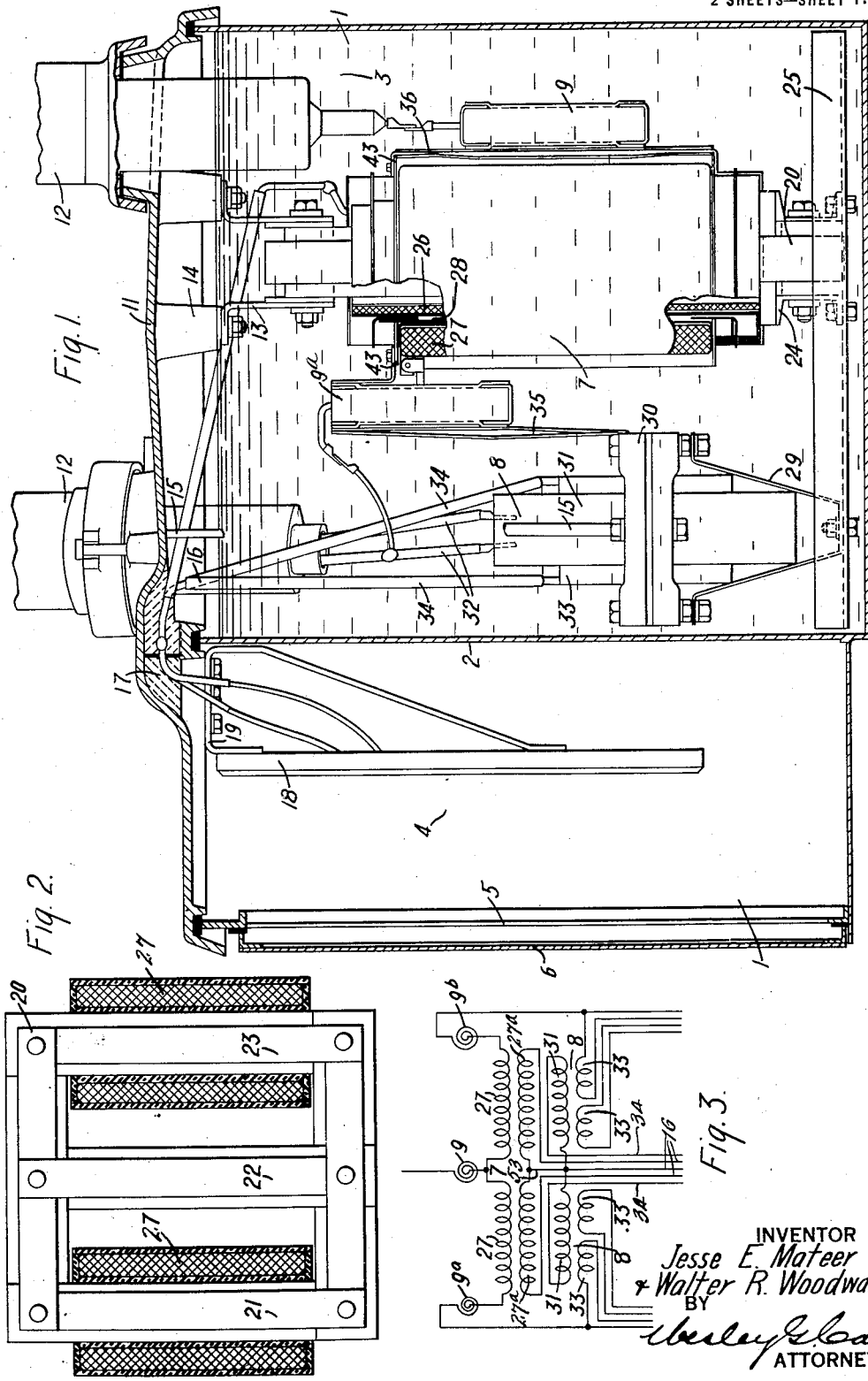
INVENTOR
Jesse E. Mateer
& Walter R. Woodward
BY
ATTORNEY

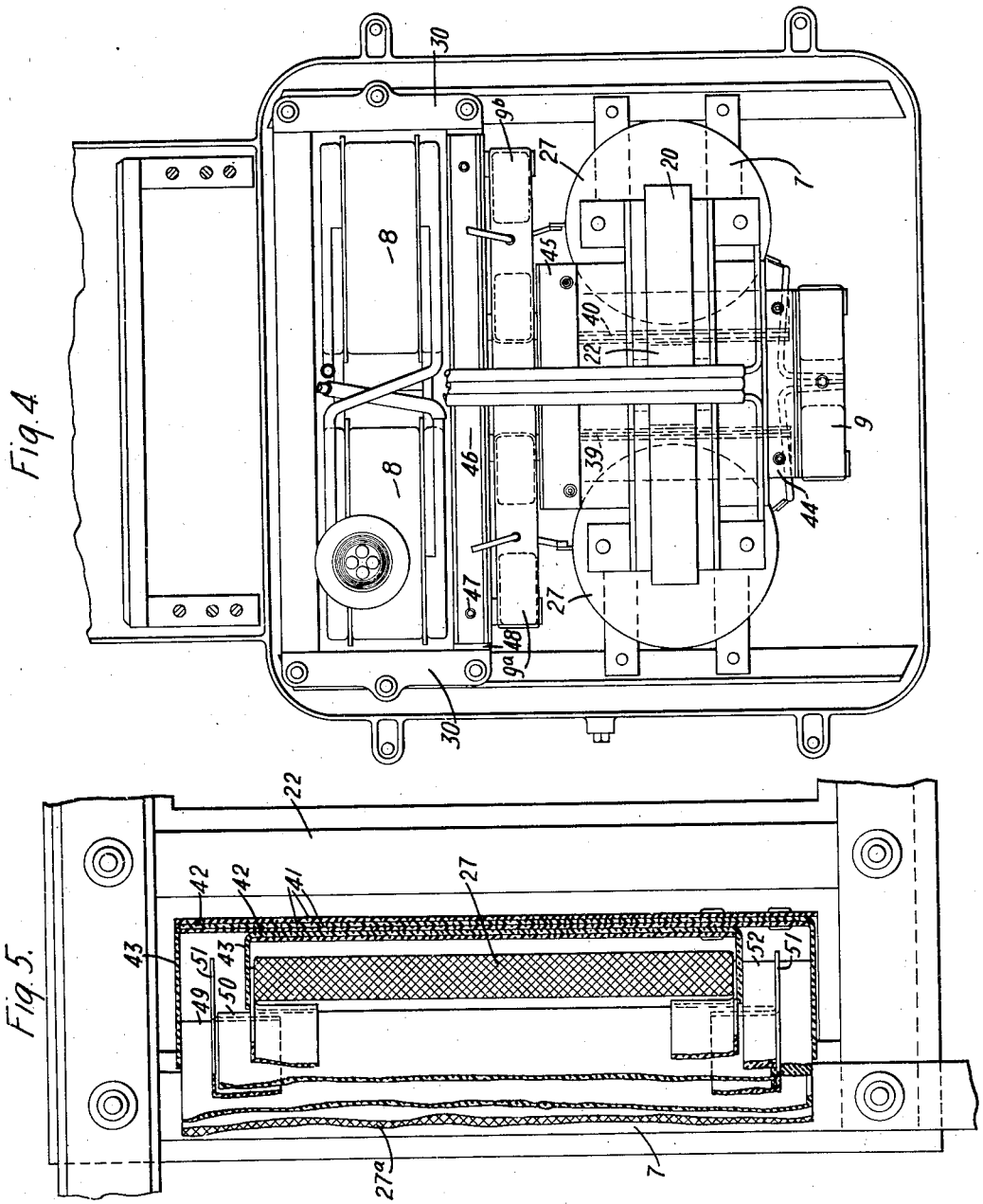

UNITED STATES PATENT OFFICE.

JESSE E. MATEER AND WALTER R. WOODWARD, OF WILKINSBURG, PENNSYLVANIA, ASSIGNORS TO WESTINGHOUSE ELECTRIC AND MANUFACTURING COMPANY, A CORPORATION OF PENNSYLVANIA.

TRANSFORMER FOR METERING SYSTEMS.

1,242,962.   Specification of Letters Patent.   Patented Oct. 16, 1917.

Application filed September 10, 1915. Serial No. 50,088.

*To all whom it may concern:*

Be it known that we, JESSE E. MATEER, a citizen of the United States, and a resident of Wilkinsburg, in the county of Allegheny and State of Pennsylvania, and WALTER R. WOODWARD, a citizen of the United States, and a resident of Wilkinsburg, in the county of Allegheny and State of Pennsylvania, have invented a new and useful Improvement in Transformers for Metering Systems, of which the following is a specification.

Our invention relates to metering systems for electrical circuits, and it has special reference to translating devices by means of which the electrical conditions obtaining on such circuits may be ascertained by measuring instruments of the usual character.

More particularly, our invention refers to a combination of voltage and current transformers utilized in a polyphase metering system in order to reduce the high-potential circuit conditions to such values as will admit of the currents and voltages being measured by the usual measuring instruments.

In outdoor installations, switchboards and their electrical appliances, such as are embodied in installations housed in suitable station-buildings, can hardly be employed because of the exposure and weather conditions to which they would be subjected. Since outdoor installations are coming into extensive use, it is necessary to provide means for conveniently determining the electrical conditions obtaining on the circuits associated therewith and, to this end, outdoor metering outfits, such as are disclosed in the present application, may be utilized.

In outdoor installations, it is desirable that the apparatus be simple and economical in construction and, at the same time, be protected in weather-proof housings or casings that are readily accessible. Since current and voltage transformers are necessary to obtain the power readings of high-potential electrical circuits, it is convenient to associate all of the transformers in a single casing in order to provide a unitary structure, means being incorporated therein for readily connecting the measuring instruments. At the same time, it is preferable to employ as little material as is consistent with good usage in order to reduce the weight and, consequently, the cost, of the transformers. As a result of the transformers being connected permanently in the high-potential circuits that are frequently subjected to high-frequency disturbances and discharges, it is necessary to protect the voltage transformers in order to preclude them from being subjected to break-down stresses. While all of the transformers are disposed in a common casing having an easily accessible terminal board, it is necessary to insulate them properly from one another and from ground by means of suitable insulating barriers. For the accomplishment of these and other ends, which will be fully brought out in the accompanying specification, our present invention is designed.

In the accompanying drawings, Figure 1 is a view, partially in elevation and partially in section, of a metering transformer constructed in accordance with our invention; Fig. 2 is a diagrammatic view illustrating the structure of the voltage transformer shown in Fig. 1; Fig. 3 is a diagrammatic representation of the electrical connections embodied in our transformer; Fig. 4 is a plan view of a portion of the structure shown in Fig. 1, and Fig. 5 is a view, partially in elevation and partially in section, showing in detail the insulating structure embodied in the voltage transformer of Figs. 1 and 2.

Referring to Fig. 1, a containing casing 1 is sub-divided by a wall 2 to form a liquid-containing compartment 3 and a second compartment 4, the latter having a lateral opening 5 that is provided with a door 6. A structure comprising a voltage transformer 7 and current transformers 8, in combination with choke coils 9, is contained in the compartment 3 which is filled to a suitable level with a body 10 of oil or other insulating fluid. A cover 11 of the casing 1 serves to close both compartments 3 and 4 and is provided with outlet insulating bushings 12 through which electrical connections may be made to the transformer. The transformer 7 is suspended by means of tie rods 13 which are secured to lugs 14 integrally formed in the cover 11. The transformers 8 are likewise suspended from the transformer cover 11 by means of tie rods 15. Low-voltage conductors 16, extending from the transformers 7 and 8, are received in the recessed portion 17 of the transformer cover 11 in order that they may bridge the wall 2 and extend to a terminal board 18 which is attached to the transformer cover 11 by means of a member 19. In this manner, the entire metering outfit may be lifted from the containing casing 1 by lifting the cover 11 of the transformer casing.

The transformer 7 comprises a rectangular core member 20 which is provided with three legs 21, 22 and 23, as shown in Fig. 2. The end portions of the core member are bolted together by means of channel irons 24 which, in turn, engage an angle-iron frame 25. A secondary coil 26 is insulated from a primary coil 27 by means of insulating barriers 28 which are tubular in form, as shown in detail in Fig. 5. The current transformers 8 are supported upon the angle-iron frame 25 by means of U-shaped members 29 that engage the lower faces of core frames 30. The high-tension coils 33 of the transformers 8 are provided with leads 32 that extend through the outlet bushing 12, and the secondary coils 31 of the transformers 8 are provided with leads 34 that are received in the recessed portion 17 of the transformer cover 11. An insulating barrier 35 is located between the current transformers 8 and the voltage transformer 7. A pair of choke coils $9^a$ and $9^b$, only one of which is shown, which is more clearly shown in Fig. 4, is secured to the upper portion of the insulating barrier 35. Likewise, an insulating barrier 36, located at the rear of the voltage transformer 7, provides means for attachment of another choke coil 9.

In Fig. 2, it will be noted that the two legs 21 and 23 of the core member 20 are the only ones provided with current-carrying coils 27. As will be hereinafter explained, the coils 27, which may be considered as the high-tension coils of the transformer 7, are connected in an open delta or V-formation and virtually constitute, in combination with their respective core members, two separate and distinct transformers. However, material may be saved and the weight of the transformer considerably lessened by combining the two transformers in such a manner as to have the common core leg 22 constitute a common path for the magnetic fluxes generated by both the current-carrying windings 27. Since the particular device shown is adapted for three-phase metering systems, the maximum value of the magnetic flux traversing the core leg 22 does not exceed that of the flux traversing the core legs 21 and 23. It will be understood, however, that this structure may be applied with equally good results to two-phase metering systems also.

By means of this construction, a unitary structure is substituted for the two voltage transformers heretofore utilized in metering systems of the aforementioned character.

Referring to Figs. 4 and 5, the structure embodied in our transformers may be observed in detail. The voltage transformer 7 comprises the two high-tension coils 27 which are wound in a cylindrical form and severally embrace the outer legs of the core member 20. The central core leg 22, being separated from the coils 27 by means of insulating barriers 39 and 40 that comprise a series of flat insulating plates 41 interleaved with insulating angle-pieces 42, is shown in detail in Fig. 5. The horizontal flange portions 43 of the angle pieces 42 project beyond the coils, as shown in Fig. 1, and to these insulating frames or barriers 44 and 45, to which the choke coils $9^a$ and $9^b$ are attached, are secured in suitable positions so that the said choke coils may be connected in circuit with the windings of the transformer 7. The choke coils $9^a$ and $9^b$ of Fig. 4, which are interposed between the transformer 7 and the current transformers 8, are also supported by the transformers 8 by means of an angular insulating plate 46 which is fastened, by means of bolts 47, to a member 48 that extends between the end frames 30 of the current transformers.

In Fig. 5, we have shown, in detail, the insulating barriers interposed between the high-tension windings 27 of the transformer 7. The low-tension coil $27^a$ is wound in a tubular form to closely embrace one of the outer core legs. Exteriorly thereof, are positioned tubular insulating members 49 and 50 that are spaced from one another in order to permit the insertion of the angular and outwardly flanged rings 51. At the lower portion, a cylindrical member 52 is placed below the high-tension coil 27 in order to provide a suitable support therefor. The insulating barrier comprising the series of parallel flat insulating sheets 41 are spaced from one another in order to permit the insertion of the insulating angle-pieces 42. As a result, the transformer core windings are adequately insulated from the central core leg 22.

In Fig. 3, we have shown a diagrammatic representation of a transforming system that comprises the structure hereinbefore described. The high-tension windings 27 of the voltage transformer 7 are connected in open delta, as mentioned above, and the leads extending therefrom are connected through choke coils $9^a$, 9 and $9^b$ and project through the high-tension outlet bushings 12. The current transformers 8 comprise high-tension windings 33 which, in this instance, are shown as being composed of two coils, as is well known in the art, and secondary low-tension coils 31. The low-tension coils of the voltage transformer 7 and the low-tension coils of the current transformers 8 are interconnected by means of a conductor 53. The low-tension leads 16, that are connected to the low-tension windings of the transformers as shown, are adapted to be connected to the terminal board 18 of Fig. 1 in order to permit them to be conveniently connected to the proper measuring instruments.

While we have herein shown and described one embodiment of our invention, it will be understood that many modifications may be made therein without departing from the spirit and scope of the appended claims.

We claim as our invention:

1. A metering transformer comprising a core member having three legs, coils disposed on the two of said legs only, said coils being adapted for connection to different phases of a polyphase system, spaced insulating barriers interposed between said coils and the third core leg, an insulating frame secured to said barriers, and a choke coil supported upon said insulating frame for protecting the transformer winding.

2. A measuring transformer comprising a rectangular core member having three legs, coils disposed on the two of said legs only, said coils being adapted for connection to different phases of a polyphase system, insulating barriers interposed between said coils and the third core leg, insulating frames secured to the outer edges of said barriers, and choke coils supported on said insulating frames and connected in series with the transformer windings.

3. In a metering system, the combination with a voltage transformer comprising a rectangular core member having three legs, coils disposed on the two of said legs only, said coils being adapted for open delta connection to a three-phase system, of a current transformer, a frame for said transformers, insulating barriers interposed between said voltage transformer coils and the third leg of said rectangular core member, other insulating barriers supported on corresponding outer edges of the first said insulating barriers and interposed between the voltage transformer and the current transformer, and choke coils supported on said second insulating barriers.

4. The combination with a measuring transformer comprising a core member and current-carrying coils disposed thereupon, of a containing case therefor comprising a liquid-containing compartment in which the transformer is disposed and a second compartment having a lateral opening, a common cover for both compartments from which said transformer is suspended, outlet bushings for the high-tension coils of the transformer, connectors extending from the transformer to said second compartment, and a terminal board disposed therein to receive the connectors, said common cover being recessed to permit said connectors to bridge the dividing wall interposed between said compartments of the casing.

5. The combination with a measuring transformer comprising a core member and current-carrying coils disposed thereupon, of a containing case therefor comprising a liquid-containing compartment in which the transformer is disposed and a second compartment having a lateral opening, a cover for both compartments permitting access through the lateral opening, a terminal board disposed in said second compartment, and connectors extending from said transformer to said terminal board which are received in a recessed portion of the casing-cover to bridge the wall common to said compartments, the terminal board and transformer being suspended from the casing cover.

6. The combination with a measuring transformer comprising a core member, and high-tension and low-tension coils, of a containing casing providing a liquid-containing chamber for the transformer and an exteriorly accessible integrally-formed chamber, a terminal board disposed in said second chamber, electrical conductors extending from the low-tension coils of the transformer to said terminal board, a cover for the containing casing, outlet bushings supported by said cover for the high-tension leads extending from the transformer, and means for supporting said transformer and terminal board from said cover whereby the same may be bodily removed from the casing with the cover.

In testimony whereof, we have hereunto subscribed our names this 28th day of Aug., 1915.

JESSE E. MATEER.
WALTER R. WOODWARD.